July 13, 1926.

C. V. EAST

CALF OR COLT WEANER

Filed Feb. 19, 1926

1,592,137

Inventor
Charles V. East

Witnesses
C. L. McDonald
Howard D. Orr

Attorney

Patented July 13, 1926.

1,592,137

UNITED STATES PATENT OFFICE.

CHARLES VINCENT EAST, OF MOLSON, WASHINGTON.

CALF OR COLT WEANER.

Application filed February 19, 1926. Serial No. 89,427.

This invention relates to devices for weaning calves, colts or other animals.

The object is to provide a simple, strong and durable device of this character which may be easily applied to the head of the young animal in a position to cause the least discomfort to the same and the least interference with his vision, the major portion of the device being securely attached to the head beneath the jaws and provided with means, in the form of prongs, at its forward end to extend in advance of the muzzle and to prick the mother animal, when approached by the young for suckling with the result that she will not permit of such operation.

Another object is to provide a weaning device composed of a minimum number of parts of light weight and suitably braced and strengthened and capable of manufacture and sale at a low cost, the attaching means for the same consisting of flexible material such as leather straps, to avoid irritation or injury to the young animal and to permit the adjustment of the same to fit different sized animals.

A full and complete understanding of the invention may be obtained from a consideration of the following detailed description, taken in connection with the accompanying drawing forming a part of this specification; it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures:—

Figure 1:
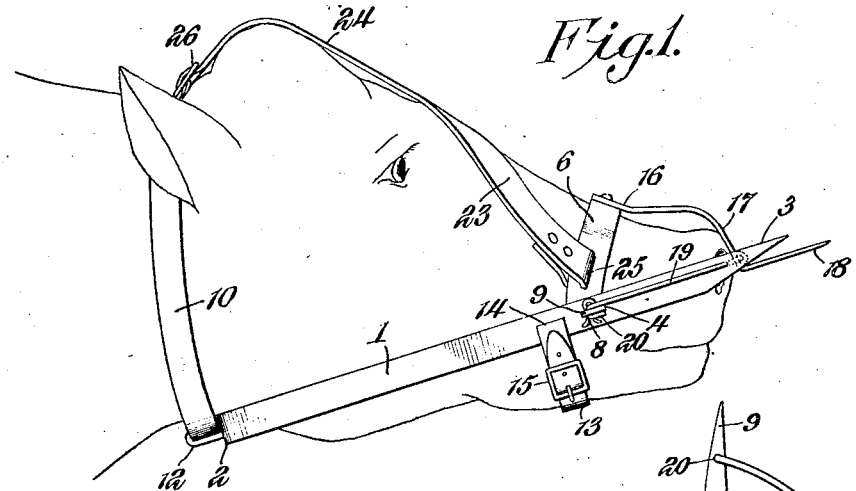
Figure 1 is a side elevation of the weaner applied to the head of a young calf.
Figure 2:
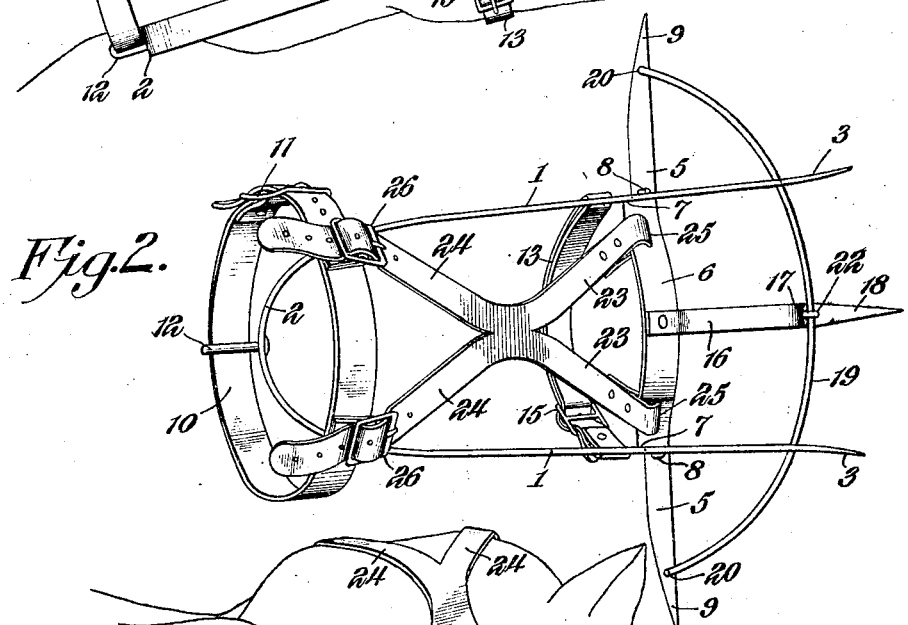
Figure 2 is top plan view of the weaner removed from the head.
Figure 3:
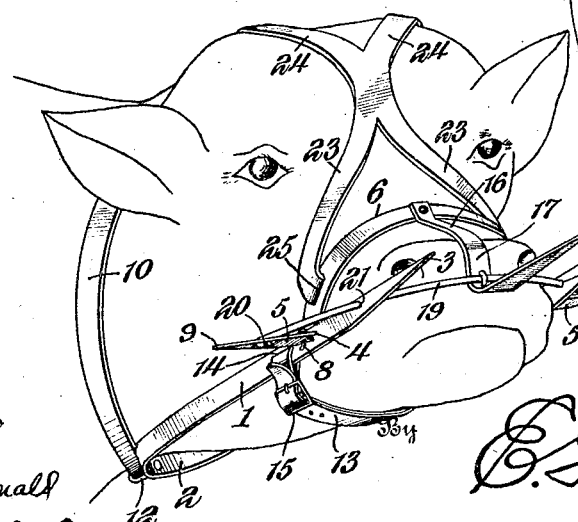
Figure 3 is a perspective view of the device in applied position.

The invention comprises a main supporting frame formed of suitable strap iron or other metal having sufficient strength and stiffness, the frame consisting of spaced side arms 1, and an integrally joined rear portion 2, which is curved into a substantial semi-circle and which is adapted to lie, when in applied position, beneath the throat of the animal with the side bars 1 rising towards their front ends to lie substantially in a horizontal plane with the nostrils of the animal, when the head is extended, as shown in Figure 1 of the drawings.

The front ends of the side bars are free and are bevelled or tapered on their under edges to form forwardly extending prongs 3, the points of which are slightly in advance of the muzzle of the animal, though not sufficiently far as to interfere with the nibbling of grass or other food.

Adjacent to their front ends, the side bars are provided with longitudinally disposed slots 4, into which are adapted to be entered the reduced terminal portions 5 of a curved or bowed nose band 6, formed of similar metal and so shaped to lie comfortably over and across the nose of the animal. The reduced end portions provide shoulders 7 which engage the inner faces of the side bars adjacent to the slots 4 and prevent said side bars from any inward movement towards each other, and a split key or cotter pin 8, passing through a suitable hole in each extension serves to prevent outward movement of the same, though any other form of connection between the members may be employed.

The reduced extensions 5 which project laterally from the head of the animal, are bevelled or tapered on their rear edges to provide prongs 9, and the nose band serves to support the front end of the frame on the animal's head, while the rear end is supported by a flexible throat latch or collar 10, which passes around the neck of the animal immediately in rear of the ears, and is equipped with buckle means 11 for adjusting the same to different sized necks. The collar 10 passes, at its lower portion, through an elongated loop or eye 12, swivelled to the center of the rear curved portion 2 of the frame, which permits of greater freedom of movement.

The rear curved portion 2, by reason of being located beneath the throat of the animal, is thus prevented from any upward movement relative to the head, and the forward end of the frame is prevented from such movement by means of a chin strap 13 engaged in slots 14 formed in the side arms 1 of the frame in rear of the slots for the nose band, and said chin strap is provided with buckle means 15, at one side, to permit of adjustment when necessary, At the center or highest point of the bowed nose band 6, there is riveted or otherwise secured the rear end of a centrally located longitudinally disposed bar 16, which extends forwardly and downwardly, as shown at 17, to surround the nose of the animal, and the front terminal portion of said bar is bent to form a central prong 18, extending in substantially the same plane as the side bars of the frame.

In order to brace and strengthen the several prongs and prevent the same from being bent out of their proper normal positions, a curved or bowed rod 19 has its terminals 20 secured to the side prongs 9 in any suitable manner, such as by bending the ends through apertures formed in said prongs, as illustrated. The bowed brace rod 19 passes through apertures 21 formed in the intermediate prongs 3 of the side arms of the frame, and to which the brace may be soldered or welded, and the intermediate portion of said brace is secured to the front prong 18 by means of a staple 22 which may have its ends clinched over on the under side of the prong 18 the said brace being located immediately in advance of the drop portion 17 of the bar 16.

The nose band 6 is connected to the top portion of the collar 10 by means of a frontal strap having diagonally disposed branches 23 and 24, the lower branches 23 having their terminals secured in slots 25 of the nose band 6, said connection being made well down over the sides of the animal's nose and adjacent to the side bars 1, while the upper branches 24 are also spread apart a substantially equal distance to pass up over the head of the animal, where they are terminally secured to the collar 10 by adjustable buckle means 26, which permits the distance between the said collar and the nose band to be materially increased or decreased, according to the size of the animal's head.

The arrangement of the supporting frame beneath the head affords greater comfort and freer movement and allows of uninterrupted vision to the calf or colt wearing the device, as the frontal straps 23 and 24 are not located in a position to interfere with the same, and the side bars, being elevated at their front ends and above the mouth, will permit the calf or colt to freely nibble the grass or other food and quickly learn to graze, after being discouraged from repeated unsuccessful attempts to suckle the mother animal, which will soon resent the pain inflicted by the several prongs and move away when approached by the young.

What is claimed is:—

1. A calf or colt weaning device comprising a U-shaped metallic frame having side arms extending forwardly at each side of the animal's head, with the connecting portion thereof beneath the throat, a metallic nose band connected to the side arms and having lateral extensions, a central forwardly extending metallic bar carried by the nose band, said side arms, lateral extensions and bar having their ends sharpened, and means for supporting the device on the animal's head.

2. A calf or colt weaner comprising a main frame formed of strap iron and bent into U-shape to constitute spaced side arms pointed at their free ends and adapted to extend forwardly at either side of the animal's head with the curved, connecting portion of the frame bearing beneath the animal's throat and the pointed ends projecting beyond the nose, a rigid nose band connecting the side arms adjacent to their front ends and curved to fit across the animal's nose to support the front end of the frame, said band having its terminals extended laterally and pointed, a central, longitudinal bar having its rear end secured to the nose band and curved to fit around the front of the animal's nose, the front terminal thereof being bent into horizontal alinement with the side arms and pointed.

3. A calf or colt weaner comprising a main frame formed of strap iron and bent into U-shape to constitute spaced side arms pointed at their free ends and adapted to extend forwardly at either side of the animal's head with the curved, connecting portion of the frame bearing beneath the animal's throat and the pointed ends projecting beyond the nose, a flexible throat strap adapted to be fastened around the neck and secured to the curved portion of the frame to support the rear end of the frame, a rigid nose band connecting the side arms adjacent to their front ends and curved to fit across the animal's nose to support the front end of the frame, said band having its terminals extended laterally and pointed, a flexible chin strap connecting the side arms adjacent to the nose band and adapted to fit beneath the lower jaw of the ainmal to prevent upward movement of the frame, a central, longitudinal bar having its rear end secured to the nose band and curved to fit around the front of the animal's nose, the front terminal thereof being bent into horizontal alinement with the side arms and pointed.

4. A weaning device comprising a frame including side bars extending forwardly and upwardly on either side of the muzzle of the animal, the front terminals being formed into intermediate prongs extending beyond said muzzle, a central bar carried by the frame and bent to conform to the nose, and lie in a plane with the side arms, the front end of the bar terminating in a prong extending forwardly in advance of the intermediate prongs, side prongs extending outwardly in a lateral direction from the side bars, and a bowed brace rod having its terminals connected to the side prongs and having connection with the central and intermediate prongs to prevent the several prongs from being bent.

5. A weaner comprising a frame having spaced side arms provided with slots near their front ends and having a rear connecting portion passing beneath the neck of the animal to be weaned, a throat strap or collar connected to said portion to secure same to the neck of said animal, a transverse nose band carried by the side arms and having reduced terminal extensions passing through the slots and held with split keys, a central longitudinal bar secured at its rear end to said nose band and extending forwardly, the side bars, transverse extensions and central bar being pointed on their ends to form prongs, an arcuate brace bar connected to all of the prongs in spaced relation to their points, an adjustable chin strap connected to the side bars of the frame in rear of the nose band, and adjustable frontal straps joined together at their centers and terminally connected to the collar and nose band respectively to adjust the device to different size heads.

In testimony that I claim the foregoing as my own, I have hereto affixed my signature.

CHARLES VINCENT EAST.